United States Patent Office 2,832,923
Patented Apr. 29, 1958

2,832,923

HIGH VOLTAGE RECTIFIER

William Lewanda, Fairlawn, N. J., assignor to International Telephone and Telegraph Corporation, New York, N. Y., a corporation of Maryland No Drawing. Application November 29, 1954
Serial No. 471,899

9 Claims. (Cl. 317—241)

This invention relates to improvements in selenium rectifiers and more particularly to the artificial barrier layer produced between the selenium and counter electrode of such rectifiers.

In U. S. Patent No. 2,660,698, patented November 24, 1953, there is described a selenium rectifier which has an artificial barrier layer produced from a lacquer. This lacquer is a "nylon" lacquer and consists essentially of a solution of a polyamide which may be more specifically defined as a linear polymeric carbonamide soluble in the lower aliphatic alcohols. The rectifiers thus produced are quite satisfactory, have relatively long life and are capable of being formed to operate at about 36 volts R. M. S. blocking voltage. Various improvements such as for the purpose of shortening the forming time have been suggested in the copending U. S. application, Serial No. 264,274 filed December 29, 1951, now Patent No. 2,724,079, by Robert R. Durst et al., for "Selenium Rectifiers," and U. S. Application, Serial No. 448,562, filed August 9, 1954, now Patent No. 2,758,266, by W. F. Bonner et al., for "Selenium Rectifier."

An object of the present invention is the provision of a method for producing a rectifier having a "nylon" type artificial barrier layer which may be formed to a higher voltage. By the foregoing we refer to the voltage which the cell can take in the high resistance direction under normal operating conditions without breaking down and without materially shortening the effective operative life of the cell.

In accordance with the main feature of the present invention it has been found that by the addition of suitable amounts of a alkali thiocyanates, particularly potassium and cesium thiocyanates, to the nylon lacquer from which the barrier layer is formed, the cells become capable of being formed to higher operating voltages such as approximately 52 to 60 volts R. M. S. The amount of the thiocyanates added to the lacquer described in said patent or said copending applications is preferably from .01 to .05% by weight.

More specifically, a lacquer of the type described in said U. S. patent may be prepared by using a nylon (such as that designated FM. 6501 by the Du Pont corporation) which is soluble in the lower aliphatic alcohols and which may be defined as a linear polymeric carbonamide of relatively high molecular weight. To this nylon may be added a carrier such as a nitro-paraffin in the form of, for example, a nitro-methane solution. A preferred composition of the lacquer described in said patent would be 10 cc. of a polyamide solution comprising by weight, 2 grams of said soluble nylon in 30 grams of isopropyl alcohol, 4 grams of furfuryl alcohol and 6 grams of water; while maintaining the solution at 50°–60° C. or refluxing the solution until the nylon is completely dissolved, then mixing the above solution with 600 cc. of a carrier comprising isopropyl alcohol and nitromethane in the ratio of three parts to one by volume respectively. The pH of the lacquer solution is then adjusted to a desired value, preferably 7, by adding thereto an appropriate amount of ammonium hydroxide. To the lacquer thus made in accordance with said U. S. patent there is added cesium thiocyanate in the amount of .01 to .05% by weight of the solution. Cesium thiocyanate is preferred because of its shorter forming time, but potassium thiocyanate also produces a high voltage cell. The thiocyanate may be directly added by simply dissolving the crystal in the nylon lacquer solution. Alternatively the thiocyanate crystals may first be dissolved in any suitable solvent such as for example methanol or isopropyl alcohol and then added.

While a specific composition of the lacquer to which I add the thiocyanates has been given only by way of example, a range of the ingredients which have been found satisfactory for this lacquer is as follows:

Nylon concentrate (proportions by weight):
    4–7% nylon
    65–75% isopropyl alcohol
    10–16% water
    7–12% furfuryl alcohol
Carrier (proportions by volume):
    1½–4½ parts isopropyl alcohol
    ½–1½ parts nitro-methane The lacquer is then prepared by mixing approximately 10–20 cc. of nylon concentrate with approximately 600–1200 cc. of the carrier. The pH of the composition, when taking the mean of the above ranges, is approximately 5 and can be varied to a preferred value (usually 7) by adding an appropriate amount of ammonium hydroxide. The thiocyanate is then added as described above.

The addition of the thiocyanates to the lacquers of the type disclosed in the other two applications mentioned above also will produce a higher voltage rectifier cell. For example a lacquer may be prepared as described in said W. F. Bonner application as follows:

A nylon concentrate is made up of the following:

30 parts by wgt. isopropyl alcohol
6 parts by wgt. of water
4 parts by wgt. of furfuryl alcohol
2 parts by wgt. nylon FM-6501

The above concentrate is weighed into a flask and refluxed gently until a clear solution is obtained.

A carrier for the concentrate consisting of a 1 to 3 mixture by volume of nitromethane and isopropyl alcohol is prepared by adding a liter of nitromethane to three liters of isopropyl alcohol.

Fifty cubic centimeters of nylon concentrate is added to 3,000 cc. of the isopropyl alcohol-nitromethane mixture and then mixed thoroughly for example by stirring with a glass rod.

The pH of the solution is adjusted to 7 by the dropwise addition of a solution comprising a mixture of 1 part by volume of a concentrated solution (28% $NH_3$) of ammonia to 2 parts by volume of distilled water. 3.75 grams, 1.25% by weight of total lacquer, of selenium dioxide is added to the solution and stirred until completely dissolved. Note that the limits of selenium dioxide may be varied from .01 to 3.0% by weight of total lacquer.

Forty-five cubic centimeters of concentrated acetic acid (1.5% by volume of total lacquer) is added and mixed thoroughly. Note that the acetic acid may be varied from 0.5 to 10%. The resultant solution may be filtered and kept until ready for use in the manufacture of the selenium cell.

In the above solution the amount of acetic acid is about 25 times the weight of nylon. The proportion of nylon to the sum of all other ingredients is about 0.06%.

Furfuryl alcohol is used in addition to the isopropyl because it affords a more rapid solution of the nylon, but it could be omitted. Likewise the isopropyl alcohol could be replaced by methane or ethyl alcohol or any low chain aliphatic alcohol. To the lacquer thus produced the thiocyanate is added as described hereinbefore and in the proportionate amount of .01 to .05% by weight.

In the making of the rectifier cell, the selenium is applied to a base plate in a conventional manner and treated to produce the proper crystalline form, the latter treatment requiring the applications of heat. The lacquer herein described is then applied in any suitable way such as for example by spraying. The lacquer is permitted to dry, preferably at room temperature, and thereafter the usual counter-electrode is applied in a conventional manner. The barrier layer remaining on the selenium is a reaction product of some or all of the components also involving the adjacent rectifier layers. While the forming current may be varied, it is preferred to apply a current of pulsating D.-C., as known in the art. During the forming, the cells may be immersed in oil for cooling purposes and the oil bath is maintained between the temperatures of 40°–70° C. approximately. As is usual in forming procedure the voltage is gradually increased. In the present application the voltage is raised until the cell has been exposed to a voltage of from 90 to 110 volts R. M. S. and is kept at this voltage for 4 hours. The cells thus produced have a blocking voltage of between 52 to 60 volts R. M. S. and are rated as such for normal operation. Such cells have the great advantage that fewer cells are needed in a stack of a definite rating. Furthermore these high blocking voltages are obtained with substantially no sacrifice in forward conductivity and no loss in useful life as compared with 26 volt cells as far as has been determined by experiment heretofore.

While I have described in the specification hereinbefore, the addition of an alkali thiocyanate such as cesium or potassium thiocyanate to the solution from which the barrier layer is formed, it will be clear that mixtures of these two thiocyanates, giving a compromise result between the characteristics of each of the individual thiocyanates in a rectifier, may be employed. Therefore, while I have described above the principles of my invention in connection with specific rectifiers and process of making same, it is to be clearly understood that this description is made only by way of example and not as a limitation on the scope of my invention as set forth in the specification and in the accompanying claims.

What I claim is:

1. A rectifier having a base plate, a layer of selenium on the base plate, a counterelectrode layer on the selenium and an intermediate layer between the selenium and the counterelectrode consisting essentially of a high molecular weight linear polymeric carbonamide soluble in the lower aliphatic alcohols, characterized in that said solution includes an alkali thiocyanate in the proportion of .01 to .05% by weight.

2. A rectifier according to claim 1 in which said alkali thiocyanate is cesium thiocyanate.

3. A rectifier according to claim 1 in which said alkali thiocyanate is potassium thiocyanate.

4. A rectifier having a base plate, a layer of selenium on the base plate, a counterelectrode layer on the selenium and an intermediate layer consisting essentially of a linear polymeric carbonamide of the type soluble in the lower aliphatic alcohols and including an additive selected from the group of cesium and potassium thiocyanate.

5. A selenium rectifier having a base plate, a layer of selenium on the base plate, a counter electrode layer on the selenium and a barrier layer between the selenium and the counter electrode deposited from a solution consisting essentially of a high molecular weight linear polymeric carbonamide soluble in the lower aliphatic alcohols, a carrier for said carbonamide, acetic acid contained in the solution in the amount of 0.5 to 10% by volume, and an alkali thiocyanate in the proportion of .01 to .05% by weight with respect to the solution.

6. A rectifier according to claim 5 in which the solution has been adjusted to pH of 7.

7. A rectifier according to claim 5 in which the solution contains selenium dioxide from .01 to 3% by weight of total lacquer.

8. A rectifier according to claim 5 in which the carrier includes a nitroparaffin.

9. A rectifier according to claim 5 in which the solution includes a nitroparaffin and at least one of the lower alcohols.

References Cited in the file of this patent

UNITED STATES PATENTS

| | | |
|---|---|---|
| 2,422,192 | Fry | June 17, 1947 |
| 2,504,226 | Rau et al. | Apr. 18, 1950 |
| 2,660,698 | Black | Nov. 24, 1953 |